United States Patent
Redmann et al.

(10) Patent No.: US 12,208,889 B2
(45) Date of Patent: Jan. 28, 2025

(54) ROTOR SYSTEM FOR AN AIRCRAFT

(71) Applicant: Kopter Germany GmbH, Hoehenkirchen-Siegertsbrunn (DE)

(72) Inventors: Daniel Redmann, Grafing b. Muenchen (DE); Nicolai Stadlmair, Munich (DE); Andreas Dummel, Hohenbrunn (DE)

(73) Assignee: Kopter Germany GmbH, Hoehenkirchen-Siegertsbrunn (DE)

( * ) Notice: Subject to any disclaimer, the term of this patent is extended or adjusted under 35 U.S.C. 154(b) by 77 days.

(21) Appl. No.: 17/796,917

(22) PCT Filed: Jan. 22, 2021

(86) PCT No.: PCT/EP2021/051486
§ 371 (c)(1),
(2) Date: Aug. 2, 2022

(87) PCT Pub. No.: WO2021/156077
PCT Pub. Date: Aug. 12, 2021

(65) Prior Publication Data
US 2023/0068624 A1    Mar. 2, 2023

(30) Foreign Application Priority Data
Feb. 5, 2020 (DE) .......................... 102020201417.5

(51) Int. Cl.
*B64C 27/82* (2006.01)
*B64C 27/473* (2006.01)

(52) U.S. Cl.
CPC ............ *B64C 27/82* (2013.01); *B64C 27/473* (2013.01); *B64C 2027/8254* (2013.01)

(58) Field of Classification Search
CPC .................. B64C 27/82; B64C 27/473; B64C 2027/8254; F05D 2260/96; F05D 2220/329; F02C 6/206
See application file for complete search history.

(56) References Cited

U.S. PATENT DOCUMENTS

| | | |
|---|---|---|
| 4,122,672 A | 10/1978 | Lowrie |
| 6,004,095 A | 12/1999 | Waitz et al. |

(Continued)

FOREIGN PATENT DOCUMENTS

| | | |
|---|---|---|
| DE | 102012018499 | 3/2014 |
| DE | 102019101359 | 7/2020 |

(Continued)

OTHER PUBLICATIONS

International Search Report for PCT Application No. PCT/EP2021/051853, dated Apr. 7, 2021, 20 pages.

(Continued)

*Primary Examiner* — Valentina Xavier
(74) *Attorney, Agent, or Firm* — Seyfarth Shaw LLP

(57) ABSTRACT

Disclosed is a rotor system for an aircraft including a rotor having multiple rotor blades disposed about an axis of rotation of the rotor substantially radially. A plane perpendicular to the axis of rotation, which extends through the rotor blades in a radial direction, forms a rotor plane. A rotor shroud surrounds the rotor circumferentially with regard to the axis of rotation, confines an air duct of the rotor extending in an axial direction of the axis of rotation, and forms a hollow structure extending circumferentially with regard to the axis of rotation. The hollow structure has on its circumferential face facing the rotor in the radial direction an area permeable to gas. The rotor plane intersects the area, and the hollow structure is configured to at least partially absorb acoustic waves of at least one frequency penetrating through the area.

15 Claims, 3 Drawing Sheets

(56) References Cited

U.S. PATENT DOCUMENTS

| | | |
|---|---|---|
| 7,779,965 B2 | 8/2010 | Marze |
| 2007/0267246 A1 | 11/2007 | Ali et al. |
| 2009/0152395 A1 | 6/2009 | Marze |
| 2009/0308685 A1 | 12/2009 | Gorny et al. |
| 2010/0133378 A1 | 6/2010 | Lidoine |
| 2013/0032664 A1 | 2/2013 | Kebrle et al. |
| 2014/0070051 A1 | 3/2014 | Kreitmair-Steck et al. |
| 2015/0210380 A1 | 7/2015 | Fischer et al. |
| 2015/0246726 A1 | 9/2015 | Pongratz et al. |

FOREIGN PATENT DOCUMENTS

| | | | |
|---|---|---|---|
| EP | 2071561 | 6/2009 | |
| EP | 2846030 A1 * | 3/2015 | ............. F02C 7/045 |
| EP | 2913269 | 9/2015 | |
| FR | 2783498 | 3/2000 | |
| GB | 2452476 | 3/2009 | |
| GB | 2478312 | 9/2011 | |
| JP | 2010-526231 A | 7/1980 | |
| JP | S55-091744 A | 7/1980 | |
| JP | 2017180938 A | 10/2017 | |
| KR | 10-1790281 B | 10/2017 | |
| RU | 2630051 C2 | 7/2013 | |
| RU | 2698497 C1 | 8/2019 | |
| RU | 2722082 C1 | 11/2020 | |
| WO | 2019022618 | 1/2019 | |
| WO | WO-2019022618 A1 * | 1/2019 | ........... B32B 27/065 |

OTHER PUBLICATIONS

Pongratzk, R., & Redmann, D. (2016); "Acoustic liner deign for Fenestron® noise reduction," 42nd European Rotorcraft Forum 2016, Lille, France, Sep. 5-8, 2016, ___ pages.

Schneider, S., Heger, R., Konstanzer, P. (2017), "Bluecopter™ Demonstrator: The State-of-the-Art in Low Noise Design," AHS International 73rd Annual Forum, Fort Worth, Texas, May 9-11, 2017, ___ pages.

* cited by examiner

ROTOR SYSTEM FOR AN AIRCRAFT

TECHNICAL FIELD OF THE INVENTION

The invention relates to a rotor system for an aircraft.

BACKGROUND OF THE INVENTION

The operation of rotor systems causes acoustic emissions that can be perceived as disturbing in terms of both volume and frequency. For applications of rotor systems for aircrafts operating in the vicinity of residential areas, measures are accordingly taken to reduce the sound level emitted into the environment per se or at least for certain frequencies.

In order to reduce the acoustic emissions of a rotor system, it is known, for example, to provide an aeroacoustic liner as well as an aerodynamic liner. The aeroacoustic liner reduces the sound generated by the rotor in general, while the aerodynamic liner is aimed at reducing the acoustic emissions induced by the rotor blade tip vortices.

For this purpose, EP 2 913 269 A1 proposes with regard to a tail rotor of a helicopter to arrange an aerodynamic liner in the form of a separate channel in the area of the rotor plane. An aeroacoustic liner is also arranged on the air discharge side of the rotor and is formed by interlinked or nested hollow structures. However, this prior art has several disadvantages. For example, the arrangement of the aeroacoustic liner next to the aerodynamic liner requires a corresponding installation space in the axial direction with respect to the axis of rotation of the rotor. In addition, the effect of the aeroacoustic liner is limited to the area of the air discharge side, so that acoustic emissions on the air intake side of the rotor are not reduced or are reduced only to a limited extent. In particular, the aeroacoustic liner cannot be implemented in a continuous manner, since the stators or supporting struts of the rotor are located in the area of the aeroacoustic liner. Ultimately, however, the weight of the tail rotor system is also increased due to the additional structures introduced to form the separate channel for the aerodynamic liner and for the interlinked or individual nested hollow structures of the aeroacoustic liner.

SUMMARY OF THE INVENTION

In view of the disadvantages associated with the prior art, it is an object of the present invention to provide a rotor system for an aircraft, which includes an aerodynamic liner as well as an aeroacoustic liner in compact design to reduce sound emissions.

Therein, the invention is generally applicable to rotor systems for aircrafts. In particular, the invention may be applied to tail rotors of a helicopter.

According to the invention, the rotor system for an aircraft comprises a rotor capable of being driven and comprising multiple rotor blades disposed in a substantially radial manner about an axis of rotation of the rotor, wherein a plane perpendicular to the axis rotation and extending through the rotor blades in a radial direction forms a rotor plane, and a rotor shroud, which surrounds the rotor circumferentially with regard to the axis of rotation and which confines an air channel of the rotor extending in an axial direction of the axis of rotation, wherein the rotor shroud forms a hollow structure extending circumferentially with regard to the axis of rotation, wherein the hollow structure has on its circumferential face facing the rotor in the radial direction at least in a section thereof an area permeable to gas, wherein the rotor plane intersects the area permeable to gas, and wherein the hollow structure is configured such that acoustic waves of at least one frequency penetrating through the area permeable to gas into the hollow structure are at least partially absorbed by the hollow structure.

The phrase "substantially radial" with respect to the arrangement of the rotor blades refers to the base direction of the rotor blades. However, it is not mandatory that these are formed strictly radial. For example, the rotor blades may have an angle of attack with respect to a geometrical radius, wherein the base direction is still radial in the meaning of a radiant arrangement of the rotor blades about the axis of rotation. Moreover, the rotor blades need not be arranged at equal distances, but can have mutually distinct distances, such as to transfer acoustic energy to multiple frequencies, for example.

The rotor shroud forms the aerodynamic liner as well as the aeroacoustic liner via the hollow structure in cooperation with the area permeable to gas formed at least in a section thereof. In other words, the aerodynamic and aeroacoustic liners are formed via the primary structure of the rotor shroud without necessitating further separate elements of the shroud. The term primary structure is used herein to clarify that the rotor shroud used to form the hollow structure does not refer to other additional structural elements not belonging to the rotor shroud per se, but to the elements of the outer shell actually intended to form the shroud. Accordingly, the hollow structure is formed by inner side surfaces arranged opposite to the corresponding outer side surfaces of the shroud. In other words, the hollow structure is formed by those elements of the shroud which constitute the outer shell of the rotor shroud. Thereby, an acoustic wave penetrating the area permeable to gas is led into a space which extends radially with respect to the axis of rotation up to an opposite inner side of the rotor shroud, or primary structure, respectively. In view of the rotor shroud extending circumferentially with respect to the axis of rotation, also the hollow structure similarly turns out to extend circumferentially. This arrangement is continuous, without addition of further stiffening elements and/or hollow space elements to be described below. Consequently, the hollow structure formed by the rotor shroud in itself results in a globally acting hollow structure. In other words, the hollow space formed by the hollow structure extends continuously in the circumferential direction. It can be adapted to a locally acting hollow structure for example by reference to the aforementioned and still to be described stiffening elements and/or hollow space elements. However, this pertains to a specific embodiment of the invention. Even under consideration of further structural elements arranged in addition to the rotor shroud, the absorption characteristics with regard to the acoustic waves penetrating through the area permeable to gas are determined by the rotor shroud itself.

It is preferred that the area permeable to gas is not only formed in sections in the circumferential direction. Rather it is formed throughout the circumference such as to act in cooperation with the hollow structure over the entire the circumference in the circumferential direction. This already results from the rotation of the rotor blades alone, which, according to their movement, initially do not show any local sound emission and/or rotor blade tip vortex maxima. In interaction with other structural components of the rotor system and/or in connection with the arrangement and/or angle of attack of the rotor blades, those maxima may, however, indeed occur locally, such that providing one or more areas permeable to gas in sections may be sufficient.

In terms of the mode of action of an aerodynamic liner of the rotor shroud, the rotor blade tip vortices strike the area permeable to gas located in the rotor plane on the circumferential face facing the rotor blades when the rotor is in operation. The rotor blade tip vortices may penetrate through the area permeable to gas, and are at least partially absorbed therein, in particular dissipated. Those rotor blade tip vortices which do not penetrate into the hollow structure are at least scattered. Besides the acoustic effects, the at least partial reduction of the rotor blade tip angles, caused for example by dissipation, may also exert an effect on the aerodynamic resistance, and may thus increase the overall thrust generation.

However, acoustic waves similarly also penetrate through the area permeable to gas into the hollow structure, wherein the hollow structure absorbs acoustic waves of at least one frequency at least partially and thus acts as an acoustic linier. Basically, in this context the terms absorption and damping of acoustic waves may be used as synonyms. Thereby, dissipation for example represents a concrete form of absorption or damping by conversion of energy. The frequencies that occur at a predetermined rotational speed of the rotor are constant. However, the amplitude of the respective frequency may be variable in dependence of the current settings of the rotor system, for example in dependence of the angle of attack of the rotor blades. Hence, the hollow structure may for example be adapted for an at least partial absorption of the frequency or frequencies, which is/are considered as particularly distracting, even if these do not necessarily cause a largest sound level. The provision of the at least partial absorption characteristic of the hollow structure may be realized geometrically, or alternatively or even supplementary by means of a suitable selection of materials.

By positioning the combined aerodynamic and aeroacoustic liner in the rotor plane, an implementation over the entire circumference of the rotor shroud without interruptions becomes possible.

The aforementioned rotor system thus necessitates a reduction of the aerodynamic effects of the rotor blade tip vortices over the area permeable to gas, an at least partial absorption and thus damping of penetrating acoustic waves, by the combination of the area permeable to gas with the hollow structure, as well as a positive influence on the efficiency of thrust generation. Since a modification of the outer contour of the rotor shroud is not needed, even the aerodynamic effect of the rotor shroud for thrust generation is maintained. However, depending on the frequency to be damped, the rotor shroud can also be adjusted, taking into account the aerodynamic effect.

However, alternative or complementary measures can be taken, which relate to the space within the hollow structure, as will be described below with regard to additional elements and/or material structures.

In one embodiment, a circumferential face of the hollow structure opposite the area permeable to gas on a side facing away from the rotor blades is spaced apart in such a way that the area permeable to gas forms, at least in sections, a lambda quarter resonator for the at least one frequency with the opposite circumferential face.

The circumferential face of the hollow structure facing the area permeable to gas on a side away from the rotor blades can also be referred to as the outer circumferential inner surface. In contrast to this, the inner side of the circumferential face facing the outer circumferential inner surface and having the area permeable to gas would be an inner circumferential inner surface. By spacing the outer and inner circumferential inner surfaces according to a lambda quarter resonator, a standing wave or multiples of the quarter wavelength (harmonics) of a corresponding wavelength or frequency or mode combination can be formed in the hollow structure. In combination with the area permeable to gas, which represents an acoustic resistance in this case, the acoustic energy is at least partially converted into thermal energy for corresponding frequencies, which represents absorption. The distance can be constant in the circumferential direction or can also vary at least in sections in the circumferential direction in order to be tuned locally to different frequencies. Such tuning can alternatively or additionally also be provided perpendicular to the direction of rotation, i.e. with respect to the axis of rotation in the axial direction. This proves to be particularly advantageous if different maxima of certain frequencies can occur in the axial direction, as can possibly result from different angles of attack of the rotor blades, which will be discussed below. The spacing of the outer and inner circumferential surfaces can be formed by appropriate arrangement of the rotor shroud material or also by appropriate material contouring. Material contours can, for example, be variations of the material cross-section so that the outer and inner circumferential inner surfaces can have locally different distances despite the material being spaced parallel to each other.

Alternatively or additionally, the hollow structure forms, at least in sections, a Helmholtz resonator for the at least one frequency.

The Helmholtz resonator is particularly suitable for absorbing or damping lower frequencies. Since medium and higher frequencies are only damped to a limited extent, the hollow structure may include an arrangement of further resonator concepts, such as the arrangement, at least in sections, of a lambda quarter resonator.

Further to the geometric design as a lambda quarter resonator, a Helmholtz resonator or a combination thereof or other resonator concepts, the acoustic damping properties may also be supported by the specific choice of materials and/or surface structures. For instance, structural features of a Helmholtz resonator can be used to attenuate lower frequencies and structural features of a lambda quarter resonator can be used to attenuate medium and/or higher frequencies.

According to an embodiment, the circumferential hollow structure may be designed to be fluid-permeable in the circumferential direction at least in sections which are aligned in parallel to the gravitational force in the circumferential direction.

Liquids, such as precipitation or cleaning water, may penetrate the hollow structure through the area permeable to gas or also through other openings in the rotor shroud. These may also run off again depending on the position of the respective openings. For example, during cleaning, water may enter through a section of the hollow structure that has an area permeable to gas that is spatially oriented such that the water runs off in the direction of the gravitational force across the area permeable to gas. However, not all sections of the circumferential hollow structure offer such a possibility of drainage. In this respect, sections that are oriented parallel to the gravitational force in the circumferential direction and thus do not have any drainage even via the area permeable to gas in this section should, in particular, be designed to be fluid-permeable. The fluid permeability in this case is not aiming at a drainage directed outwards, but concerns the fluid conduction in the hollow structure, so that penetrating fluids can be led in the hollow structure at least up to a section that allows drainage. Since the rotor system according to the invention can be formed directly via the primary structure, the internal fluid conduction via the hollow structure can thus be realized in a simple manner.

However, the design of the hollow structure that is at least partially fluid-permeable also allows the resonator space that may effectively be used to be extended in the circumferential direction. For this purpose, it can be assumed that the fluid permeability in this case also causes a gas permeability. Even if no resonator cavity is formed in the sense of a formation of standing waves, at least individual frequencies can be damped, for example by dissipation.

It is preferred that the hollow structure comprises at least one drainage opening.

Liquid that has penetrated the hollow structure can be selectively drained or ran off via the drainage opening. The location of the drainage may thus be selected at a suitable location and/or the timing of the drainage can be set in advance if the drainage opening can be selectively opened and closed. The drainage opening can be formed by the area permeable to gas. However, this may be insufficient in some cases because, for example, the area permeable to gas of a tail rotor of a helicopter may not form the lowest point of the hollow structure when it is in a stationary state. Accordingly, the area permeable to gas in this case might just act as an overflow or spillway, but cannot independently drain fluids from the hollow structure that are located below the area permeable to gas. Accordingly, a separate drainage opening may be advantageous.

In particular, the rotor blades have an angle of attack that is variably adjustable about an axis that is radial with respect to the axis of rotation, and the area permeable to gas extends axially with respect to the axis of rotation at least over an area that covers the rotor blade positions that can be accomplished via the angles of attack.

Depending on the flight manoeuvers to be performed, the angle of attack of the rotor blades is changed. This also changes the position of the area in which rotor blade tip vortices are generated. In order to encompass all area positions of the rotor blade tip vortices associated with the angles of attack, the area permeable to gas extends at least in sections, in particular in the circumferential direction over the entire circumferentially extending surface, and in the axial direction at least over the area over which all rotor blade positions can be covered in accordance with the rotor blade angles of attack. Otherwise, i.e., with an axial extension of the area permeable to gas that does not cover all adjustable rotor blade positions, the aerodynamic effect of the area permeable to gas is not present for all rotor blade positions or rotor blade angles of attack, or is at least substantially restricted.

Since the propagation of the rotor blade tip vortices in the radial direction with respect to the axis of rotation of the rotor is not limited to the area bounded by the rotor blade tip, i.e., the rotor blade tip vortices may propagate in an scattering manner not purely radially but also in the axial direction, the area permeable to gas in the axial direction may in particular be designed to be larger than the overlap area of the rotor blade positions. Preferably, the area permeable to gas is, starting from the rotor plane in the axial direction outwards, larger at least on one side, more specifically on both sides, than the overlap area of the rotor blade positions, which is in relation to this section, in accordance with the rotor blade angles of attack.

In one embodiment, the fraction of porosity of the area permeable to gas ranges from 5% to 90%.

The area permeable to gas is basically defined as the area that has a predominant gas permeability compared to other areas of the rotor shroud. The term "predominantly" does not necessarily refer to a gas permeability of more than 50%, but to a material property that can be identified as gas-permeable. The area is thereby confined via the outermost gas-permeable openings, such as pores, beyond which the rotor shroud transitions into a gas-impermeable material area.

Thus, if the area permeable to gas is formed by pores, the proportion of the void volume, i.e., the volume of all pores in this area, to the total volume of this area is from 5% to 90%. With a lower proportion of the void volume, the rotor blade tip vortices are predominantly reflected and no longer introduced into the hollow structure. Thus, the aerodynamic liner no longer operates effectively. Likewise, the acoustic bandwidth of the lambda quarter resonator suffers and at the same time there is a shift in the mode of action of the liner from a lambda quarter resonator in the direction of a Helmholz resonator for very low frequencies, which are no longer relevant for the audible range. With a proportion of more than 90% of the cavity volume, the absorption or damping capacity can be significantly reduced if rotor blade tip vortices and/or acoustic waves penetrating through the pores can escape again without significant damping.

According to an embodiment, the porosity varies starting from the rotor plane in the axial direction in relation to the axis of rotation. In particular, the porosity increases starting from the rotor plane towards at least one side in the outward direction.

By changing the porosity in the axial direction, the acoustic impedance and thus the acoustic behavior of the aerodynamic and aeroacoustic liner can be locally adjusted. This may be particularly advantageous for rotor blades with adjustable angles of attack, since the frequency amplitudes shift with varying the angles of attack. Preferably, a larger porosity, i.e., a larger void volume, is to be provided in the outer regions of the area permeable to gas, which are relevant to the effect at larger angles of attack of the rotor blades. The change in porosity can be expressed as porosity per unit area.

Alternatively or complementarily, the porosity changes in the circumferential direction of circulation of the area permeable to gas.

A porosity varied in the circumferential direction allows adjusting the impedance and thus the acoustic behavior along the circumference. Consequently, the interaction of sound emission with various structural elements along the circumference can be taken into account, even under a possible consideration of adjustable angles of attack of the rotor blades By a combination of porosity varied in the axial direction as well as in the circumferential direction, the acoustic properties can be optimized both structurally and operationally.

In one embodiment, the area permeable to gas is formed by microperforation, a perforated metal plate and/or a wire mesh.

Microperforation of a rotor shroud profile or a section thereof is able to introduce a gas permeability to the area permeable to gas without necessitating structural disruption. Furthermore, the distribution of the microperforation can be implemented precisely as needed. The separate insertion of a perforated plate and/or a wire mesh allows flexible adjustment of the acoustic behavior by replacing the respective insert. Furthermore, in such a case it is possible to take advantage of different material properties independently from the material of the actual rotor shroud.

According to a further embodiment, the hollow structure has stiffening elements and/or hollow structural elements which, in their position and/or design, have a sound-absorbing effect or promote sound absorption.

Stiffening elements, which are used specifically for stabilization, or also other hollow structure elements, which serve, for example, as a line or pipe guide, may thus also be used to improve the sound-absorbing or/and sound-absorbing properties of the rotor system. This also makes it possible to dispense with additional components and structures intended solely for sound absorption.

The positioning may be performed in the circumferential direction as a function of the frequency to be at least partially absorbed, for example due to the natural frequencies of the gas volume enclosed inside the overall structure or inside acoustically separated subspaces. Alternatively or complementarily, the positioning in the circumferential direction may also be performed as a function of the local interaction of the acoustic emissions with respective structural components. By means of the positioning, the depth and/or the volume of the hollow structure may thus be influenced via the stiffening elements and/or hollow structural elements in order to specifically increase the at least partial absorption of at least one frequency. Accordingly, this also makes it possible to transfer a globally acoustically effective hollow structure, such as one that may be formed by a structure that is continuous in the circumferential direction without stiffening elements and/or hollow structural elements, into a locally acoustically effective hollow structure.

In contrast, the design of the stiffening elements and/or hollow structural elements refers to the concrete geometric design, such as the contour or material thickness, the material to be used and/or various surface properties, such as can be implemented via coatings or surface texturing.

In particular, the hollow structure may absorb substantially penetrating acoustic waves in a broadband frequency range.

The broadband design relates significantly to the effect of the structure as an aeroacoustic liner, which is further supported by variable depths of the hollow structure, i.e., spacings in the radial direction with respect to the axis of rotation. Furthermore, the appropriate choice of the perforation of the area permeable to gas may increase the bandwidth at the expense of the absolute absorption of the liner.

In one embodiment, the hollow structure at least partially absorbs substantially penetrating acoustic waves in a frequency range from 30 Hz to 1500 Hz.

In this frequency range, precisely those frequencies occur which are also perceived as particularly disturbing. In particular, however, this frequency range also includes frequencies with amplitude maxima that are usually clearly perceptible. Accordingly, the overall volume level can be lowered if a suitable choice is made.

According to an embodiment, the rotor system comprises at least one support strut arranged on an air intake side of the rotor system.

Support struts, which are sometimes also referred to as a stator, serve to suspend the rotor hub. These are usually arranged on the air discharge side of a rotor system, whereby the air duct, which is wider in the axial direction with respect to the axis of rotation and is formed by the rotor shroud, compensates for the sound emissions associated with this arrangement. However, if the at least one supporting strut for suspending the rotor hub is now arranged on the air intake side, the sound emissions otherwise caused by the impact of the air accelerated by the rotor on the supporting strut are reduced. In other words, a further source of sounds on the air discharge side is avoided, so that the axial width of the air duct can be reduced. The air intake side is understood to be the side on which air is drawn in for the majority of the flight manoeuvers. Similarly, the air discharge side is the side on which air is discharged for the majority of the flight manoeuvers.

Preferably, the at least one supporting strut is arranged eccentrically, or off-center, with respect to the axis of rotation.

The eccentric arrangement supports the reduced sound emission due to the time-shifted interaction between the wake in the velocity profile of the incident flow caused by shadowing effect of the supporting strut and the leading edge of the rotating rotor blades in regular operation, i.e., for torque compensation of the main rotor. In case of negative angles of attack of the rotor blades due to manoeuvers of the flying machine, there is also no simultaneous interaction. In this regard, however, the interaction between the vortices induced by the rotating rotor blades and the supporting struts, which are responsible for a sound generation, is meant.

Features, usefulness and advantages of the invention are also described below with reference to the drawings by way of embodiments.

DETAILED DESCRIPTION OF THE EMBODIMENTS

Figure 1:
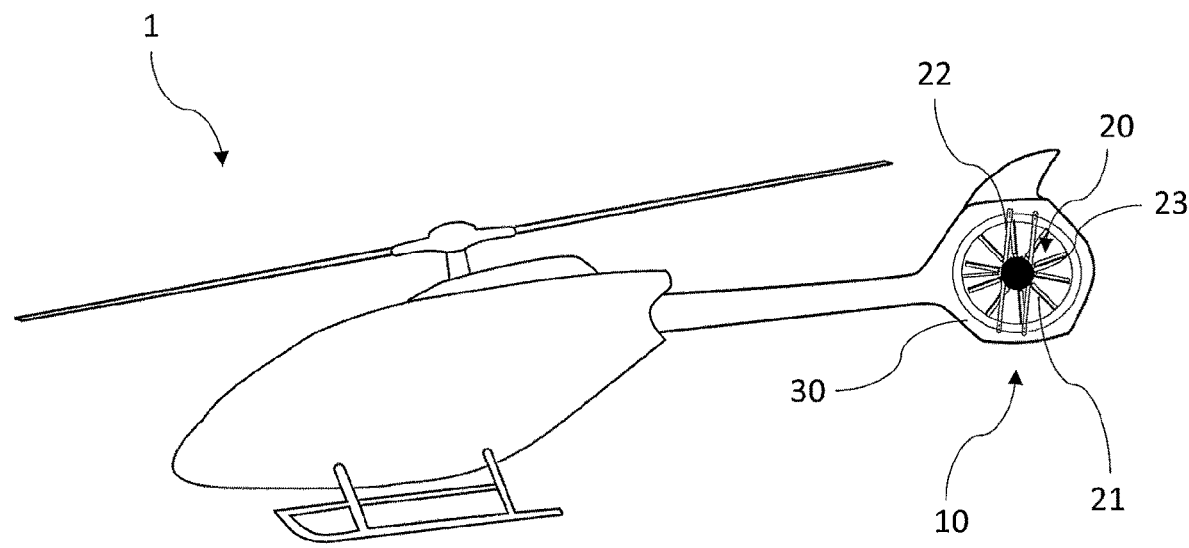
FIG. 1 shows a schematic representation of an aircraft having a rotor system in accordance with an exemplary embodiment of the invention.
Figure 2:
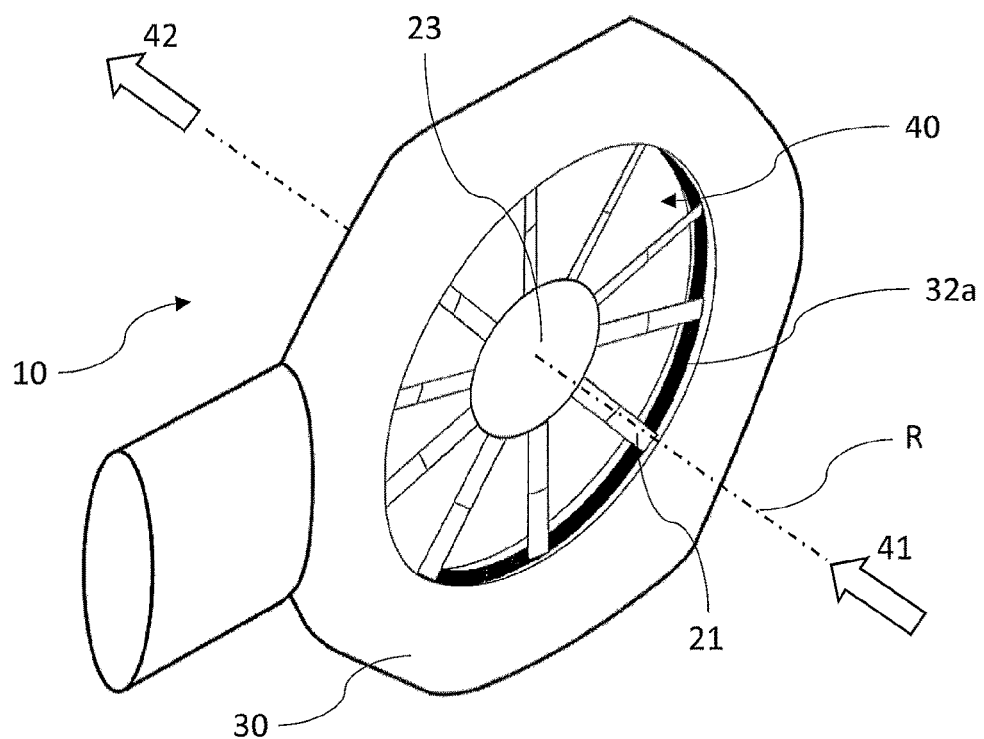
FIG. 2 shows a perspective view of the rotor system of FIG. 1.

FIG. 1 shows an aircraft 1, in this case a helicopter, having a rotor system 10, which in the embodiment shown is used as the tail rotor system of the helicopter. The rotor system 10 comprises a rotor 20 having rotor blades 21 arranged around a rotor hub 23 supported by preferably a plurality of support struts 22, and a rotor shroud 30. The support struts 22 are arranged on an air intake side 41 (FIG. 2) to avoid another sound source on an air discharge side 42 (FIG. 2). In addition, an eccentric arrangement of the supporting struts 22 with respect to the axis of rotation R is provided, which also has a positive acoustic effect. The air intake side 41 and the air discharge side 42 are respectively the sides on which the air is drawn in and discharged for a predominant part of the flight manoeuvers. In other words, air can also be discharged on the air intake side 41 if the angle of attack of the rotor blades 21 is correspondingly negative, although this is only to be assumed in a few cases during flight operation, so that such cases are negligible for the definition of the air intake side 41. This applies equally to the air discharge side in the reverse constellation.

According to FIG. 2, the rotor shroud 30 surrounds the rotor 20 in the circumferential direction with respect to the axis of rotation R and confines an air duct 40 of the rotor 20 extending in the axial direction of the axis of rotation R. As a result of the rotation of the rotor blades 21 about the axis of rotation R, air is conveyed from the air intake side 41 to the air discharge side 42, which can also be referred to as the thrust side. The air flow direction is also illustrated again in FIG. 2 by the arrows inserted therein, although this can also be reversed depending on the setting of the rotor blades. As can further be seen from FIG. 4, in the rotor plane RA formed by the rotor blades 21 perpendicular to the axis of rotation R, the circumferential face 32 of the rotor shroud 30 facing the rotor 20 has an area permeable to gas 32*a* which is intersected by the rotor plane RA and extends axially to both sides of the rotor plane RA with respect to the axis of rotation R. The area permeable to gas 32*a* is formed by the rotor blades 21.

Figure 3:
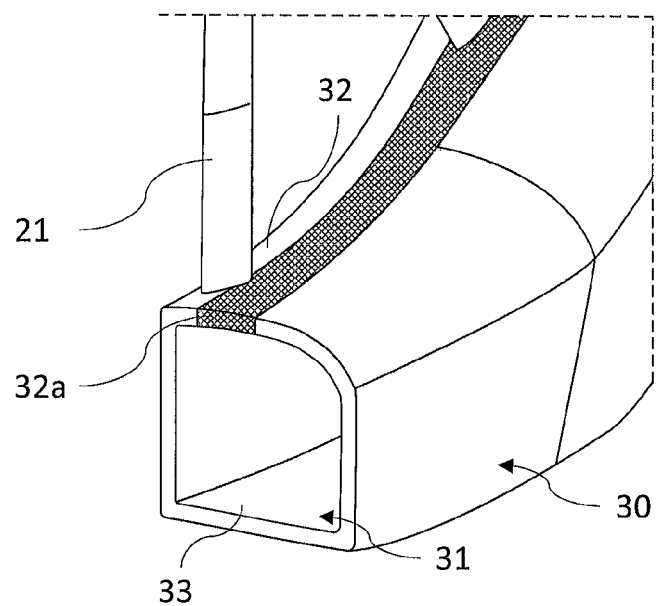
FIG. 3 shows a perspective cross sectional view of the rotor system of FIGS. 1 and 2 in sectional plane parallel to the axis or rotation.

FIG. 3 shows in more detail a perspective cross-sectional section of the rotor system 10 according to FIGS. 1 and 2 in a sectional plane parallel to the axis of rotation R. In this exemplary embodiment, the area permeable to gas 32*a* is formed by a perforated metal plate with microperforations, which is inserted and fixed in the rotor shroud 30. The porosity introduced by the microperforations amounts to, for example, 50% and is constant in the circumferential direction as well as in the axial direction with respect to the axis of rotation R. However, the porosity may also vary in the circumferential direction as well as in the axial direction with respect to the axis of rotation R and/or be less than or greater than 50%. The selection of the porosity or its distribution can result from the respective optimization objective with regard to aeroacoustic or aerodynamic effects in interaction with a respective structural design.

The area permeable to gas 32*a* covers the radial projection of the rotor blade tip of the rotor blades 21, so that rotor blade tip vortices generated in the gap between the rotor blade tips and the area permeable to gas 32*a* can be introduced through the area permeable to gas 32*a* into the hollow structure 31 formed by the rotor shroud 30 to be dissipated or otherwise damped, so that an aerodynamic effect is achieved. In this regard, the aerodynamic effect refers, on the one hand, to an acoustic effect by eliminating or displacing the acoustic sources associated with the rotor blade tip vortices into the hollow structure 31. On the other hand, the efficiency of the rotor system 10 is increased by the drag reduction caused by the attenuation and/or displacement of the rotor blade tip vortices. In addition, the area permeable to gas 32*a* in combination with the volume formed by the hollow structure 31 implements an aeroacoustic function in which a purely acoustic effect is also achieved for acoustic waves coupled into the hollow structure 31 via the area permeable to gas 32*a*, which are also generated, for example, by components other than the rotor blade tips during operation of the rotor 20, by at least partial absorption of at least one frequency.

For this purpose, in the embodiment shown, the inner surface, which faces the rotor 20, of the circumferential face 33 facing away from the rotor 20, i.e., an outer circumferential inner surface 33*a*, is spaced apart from the inner surface, which faces away from the rotor 20, of the circumferential face 32 facing the rotor 20, i.e., an inner circumferential inner surface 32*b*, in such a way that a lambda quarter resonator is formed for at least one frequency.

Accordingly, a combined aerodynamic and aeroacoustic liner is formed by the positioning and dimensioning of the area permeable to gas 32*a* in cooperation with the volume of the hollow structure 31.

Figure 4:
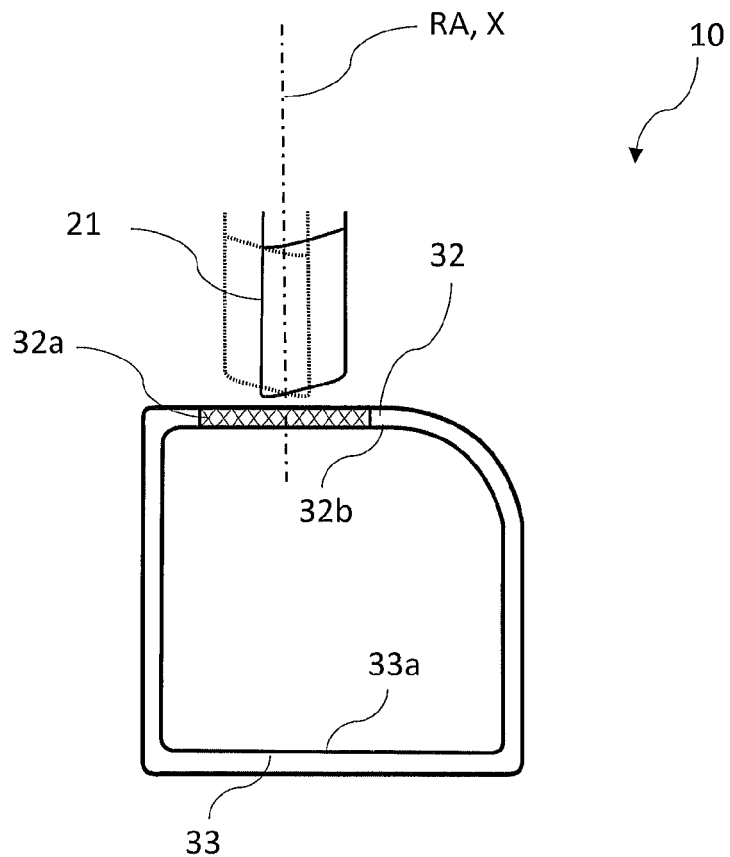
FIG. 4 shows a schematic cross sectional view of the rotor system according to FIG. 3 with a direction of view onto the sectional plane and representation of the positional range of the rotor blades.

FIG. 4 again shows a schematic cross-sectional view of the rotor system 10 according to FIG. 3, with a viewing direction towards the sectional plane to illustrate the adjustable positional range of angles of attack of the rotor blades 21 and the overlap of the rotor blade tips over that range of pitch angle positions by the area permeable to gas 32*a*. For this purpose, FIG. 4 shows the maximum attainable angle positions of the rotor blades 21 when rotating about the radial axis X with respect to the axis of rotation R for the rotor blade pitch angle. Starting from the rotor plane RA, which coincides with the radial axis X, the area permeable to gas 32*a* extends to both sides in the axial direction with respect to the axis of rotation R, the area permeable to gas 32*a* covering the maximum pitch angle positions of the rotor blade tips. In the exemplary embodiment shown, the area permeable to gas 32*a* is also enlarged relative to the maximum positions of the rotor blade tips in order to be able to also introduce scattered rotor blade tip vortices into the hollow structure.

Figure 5:
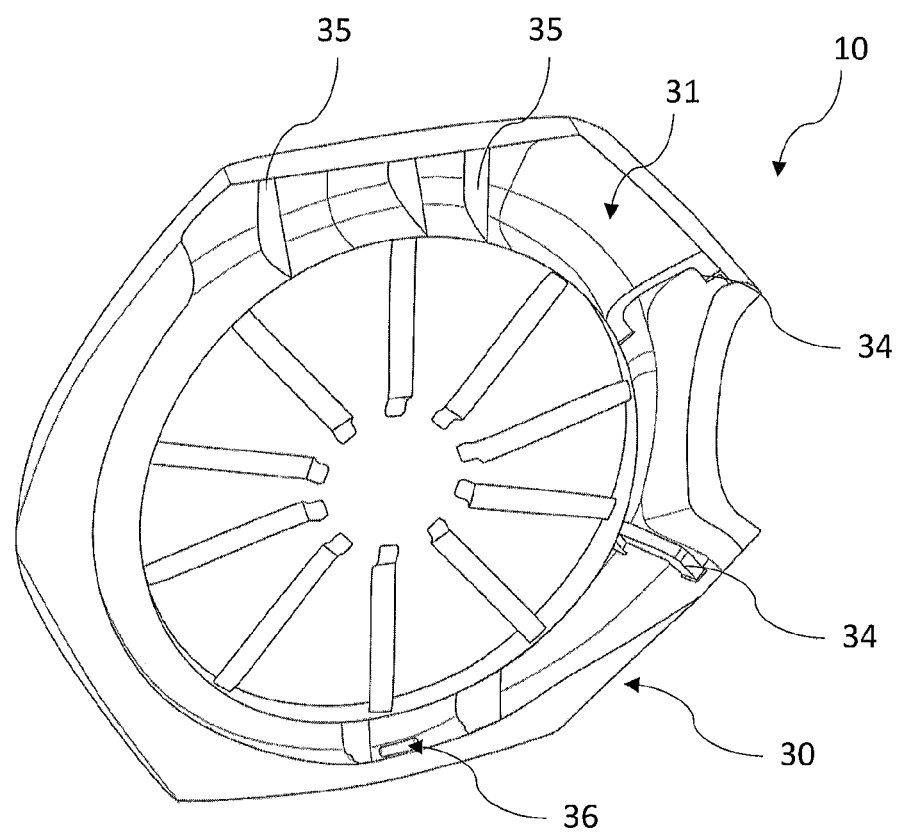
FIG. 5 a perspective cross-sectional section of the rotor system according to FIGS. 1 and 2 in a sectional plane perpendicular to the axis of rotation.

By means of FIG. 5, a perspective cross-sectional section of the rotor system 10 according to FIGS. 1 and 2 is exemplarily shown in a sectional plane perpendicular to the axis of rotation R. Herein, the rotor shroud 30 forms a hollow structure 31 with different distances between the outer and inner circumferential surfaces in the circumferential direction. Accordingly, locally differing lambda quarter resonators are formed so that locally different frequencies can be at least partially absorbed, which reduces the overall loudness and confers to the liner a broadband acoustic effect. In particular, the different spacings can be provided in such a way as to preferentially attenuate tonal components corresponding to the rotational frequency of the rotor and/or frequencies otherwise perceived as particularly annoying.

In addition, the hollow structure 31 has various stiffening elements 34 and hollow structural elements 35. The stiffening elements 34 serve here, for example, as stops and, in terms of their dimensioning and positioning, also influence the damping of acoustic waves introduced into the hollow structure and/or propagating therein, respectively. Similarly, the additionally introduced hollow structural elements 35 may form chambers in the hollow structure 31, for example, in order to form locally different resonator volumes in each case and to thereby influence the damping of frequencies. Nevertheless, the damping capacity here is largely determined by the primary structure of the rotor shroud 30.

Referring to FIG. 5, the rotor shroud 30 further has a drainage opening 36 through which a liquid that has entered the hollow structure 31 can be drained. The drainage opening 36 is located in a lower region of the rotor shroud 30 with respect to the direction of gravity, in which region a liquid collects due to gravity. For this purpose, the hollow structure 31 is preferably circumferentially partially permeable to fluid, i.e., is formed as a continuous circumferential fluid channel. Even if stiffening elements 34 and/or hollow structural elements 35 are arranged in the hollow structure 31, these should then either be at least partially fluid-permeable or be arranged in positions that allow a fluid to be discharged or drained in some other way. The latter can be illustrated by the hollow structural elements 35 shown in FIG. 5. Provided that these hollow structural elements are not designed to be fluid-permeable, they are arranged at least at positions in which a liquid present in the upper chamber formed by the hollow structural elements 35 can be discharged via the area permeable to gas 32*a* not shown here. The area permeable to gas 32*a* would thus in this case also be fluid-permeable.

The invention is not limited to the embodiment described. In particular, certain features of possible variants or further embodiments are in principle also applicable to other embodiments, provided that this is not reasonably excluded.

For example, even if the rotor hub 23 is supported by two support struts 22, only one support strut may be provided. Likewise, it is possible to use more than two supporting struts. In particular, however, the use of the rotor system 10 is also not limited to a tail rotor system of a helicopter, but can also be used for other aircraft, such as drones or air cabs.

LIST OF REFERENCE NUMERALS 1 aircraft
10 rotor system
20 rotor
21 rotor blade
22 strut
23 rotor hub
30 rotor shroud
31 hollow structure
32 circumferential face (facing the rotor)
32a area permeable to gas
32b inner circumferential surface
33 circumferential face (facing away from rotor)
33a outer circumferential surface
34 stiffening element
35 hollow structural element
36 drainage opening
40 air duct
41 air intake side
42 air discharge side
R axis of rotation
RA rotor plane
X radial axis (rotor blade pitch angle position)

The invention claimed is:

1. A rotor system for an aircraft, comprising:
a rotor configured to be driven and having multiple rotor blades disposed about an axis of rotation of the rotor substantially radially, wherein a plane perpendicular to axis of rotation, which extends through the rotor blades in a radial direction, forms a rotor plane, and
a rotor shroud, which surrounds the rotor circumferentially with regard to the axis of rotation and which confines an air duct of the rotor extending in an axial direction of the axis of rotation,
wherein the rotor shroud comprises an outer shell that forms a hollow structure extending circumferentially with regard to the axis of rotation, the outer shell delimiting a hollow space that forms the hollow structure,
wherein the outer shell of the hollow structure has on its circumferential face facing the rotor in the radial direction at least in a section thereof an area permeable to gas,
wherein the rotor plane intersects the area permeable to gas, and
wherein the hollow space of the hollow structure is configured such that acoustic waves of at least one frequency penetrating through the area permeable to gas into the hollow structure are at least partially absorbed by the hollow structure.

2. The rotor system according to claim 1, wherein a circumferential face of the hollow structure opposite the area permeable to gas on a side facing away from the rotor blades is spaced apart in such a way that the area permeable to gas forms, at least in sections, a lambda quarter resonator with the opposing circumferential face for the at least one frequency.

3. The rotor system according to claim 1, wherein the hollow structure forms, at least in sections, a Helmholtz-resonator with regard to the at least one frequency.

4. The rotor system according to claim 1, wherein the circumferential hollow structure is fluid-permeable in the circumferential direction at least in sections, which are aligned in parallel to the gravitational force in the circumferential direction.

5. The rotor system according to claim 1, wherein the hollow structure comprises at least one drainage opening.

6. The rotor system according to claim 1, wherein the rotor blades have an angle of attack that is variably adjustable about an axis that is radial with respect to the axis of rotation and the area permeable to gas extends axially with respect to the axis of rotation at least over an area that covers the rotor blade positions that can be accomplished via the angles of attack.

7. The rotor system according to claim 1, wherein the fraction of porosity of the area permeable to gas ranges from 5% to 90%.

8. The rotor system according to claim 7, wherein the porosity varies starting from the rotor plane in the axial direction in relation to the axis of rotation.

9. The rotor system according to claim 7, wherein the porosity varies in the circumferential direction of the area permeable to gas.

10. The rotor system according to claim 1, wherein the area permeable to gas is formed by microperforation, a perforated metal plate, and/or a wire mesh.

11. The rotor system according to claim 1, wherein the hollow structure has stiffening elements and/or hollow structural elements, which, in their position and/or design, have a sound-absorbing effect or promote sound absorption.

12. The rotor system according to claim 1, wherein the hollow structure absorbs substantially penetrating acoustic waves in a broadband frequency range.

13. The rotor system according to claim 1, wherein the hollow structure at least partially absorbs substantially penetrating acoustic waves in a frequency range from 30 Hz to 1500 Hz.

14. The rotor system according to claim 1, wherein the rotor system comprises at least one support strut arranged on an air intake side of the rotor system.

15. The rotor system according to claim 14, wherein the at least one supporting strut is arranged eccentrically with respect to the axis of rotation.

* * * * *